Figure 7:
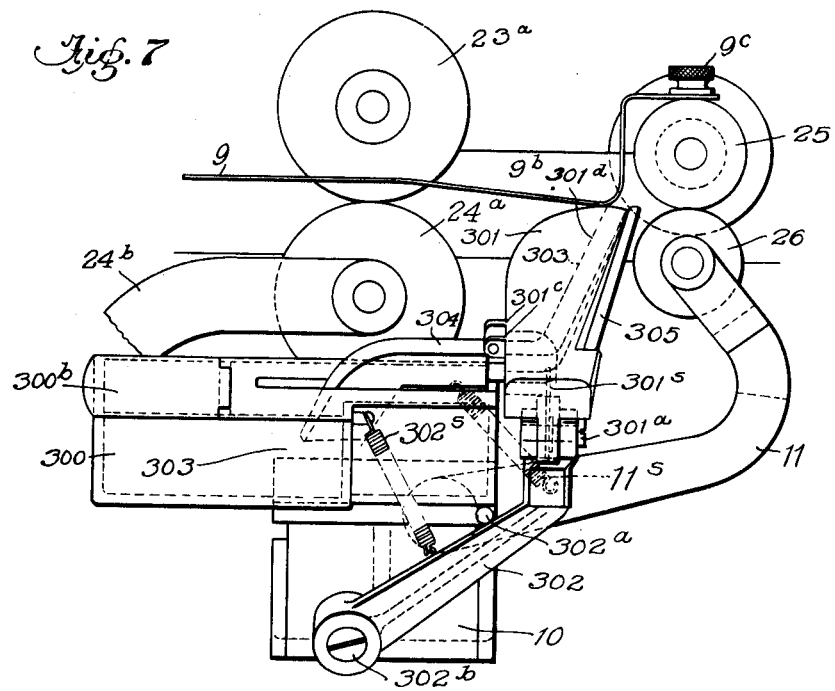

Oct. 18, 1927. 1,646,106
A. H. PITNEY ET AL
MOISTENER AND SEALER FOR POSTAGE METER MACHINES
Filed March 22, 1924 5 Sheets-Sheet 1
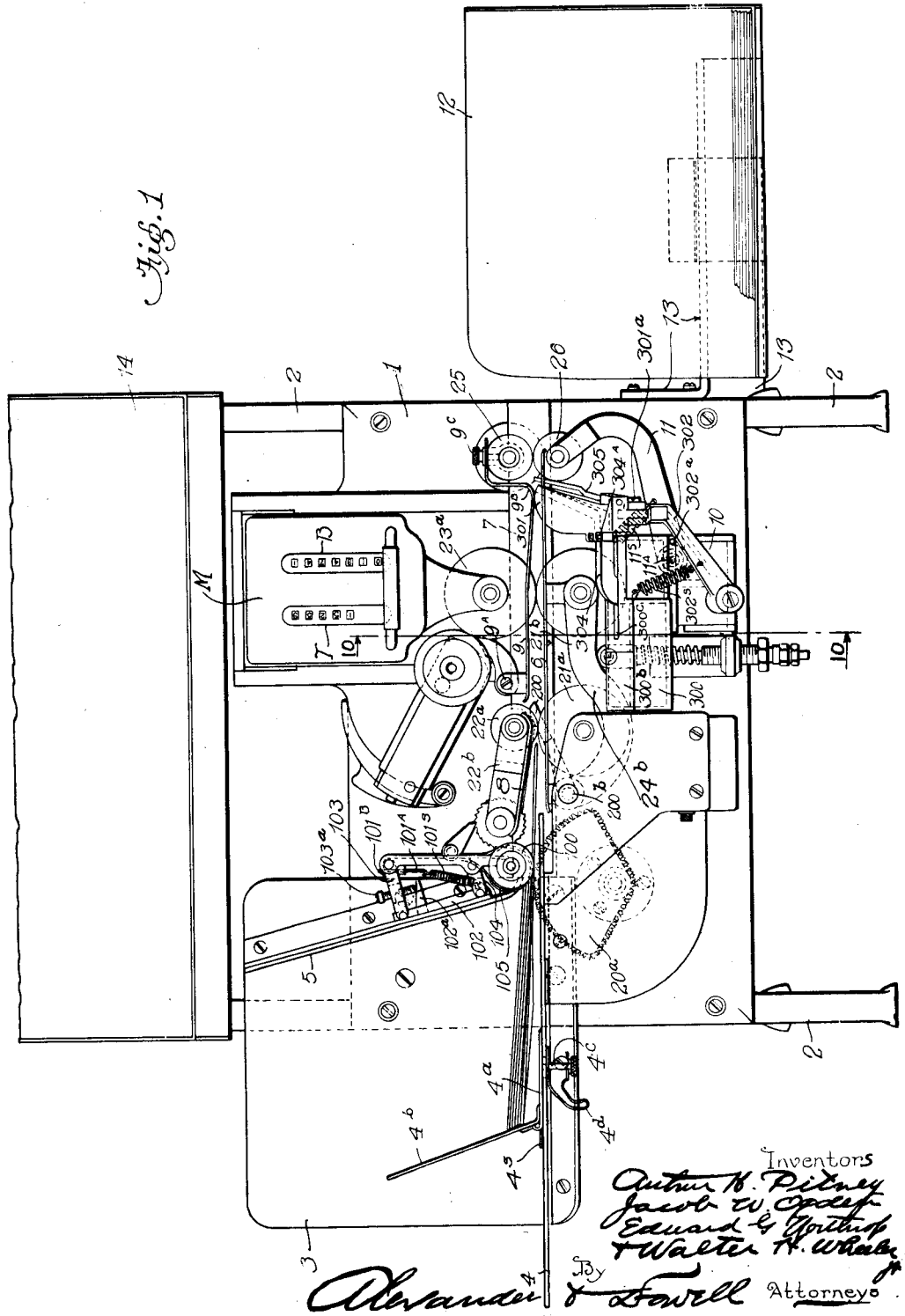

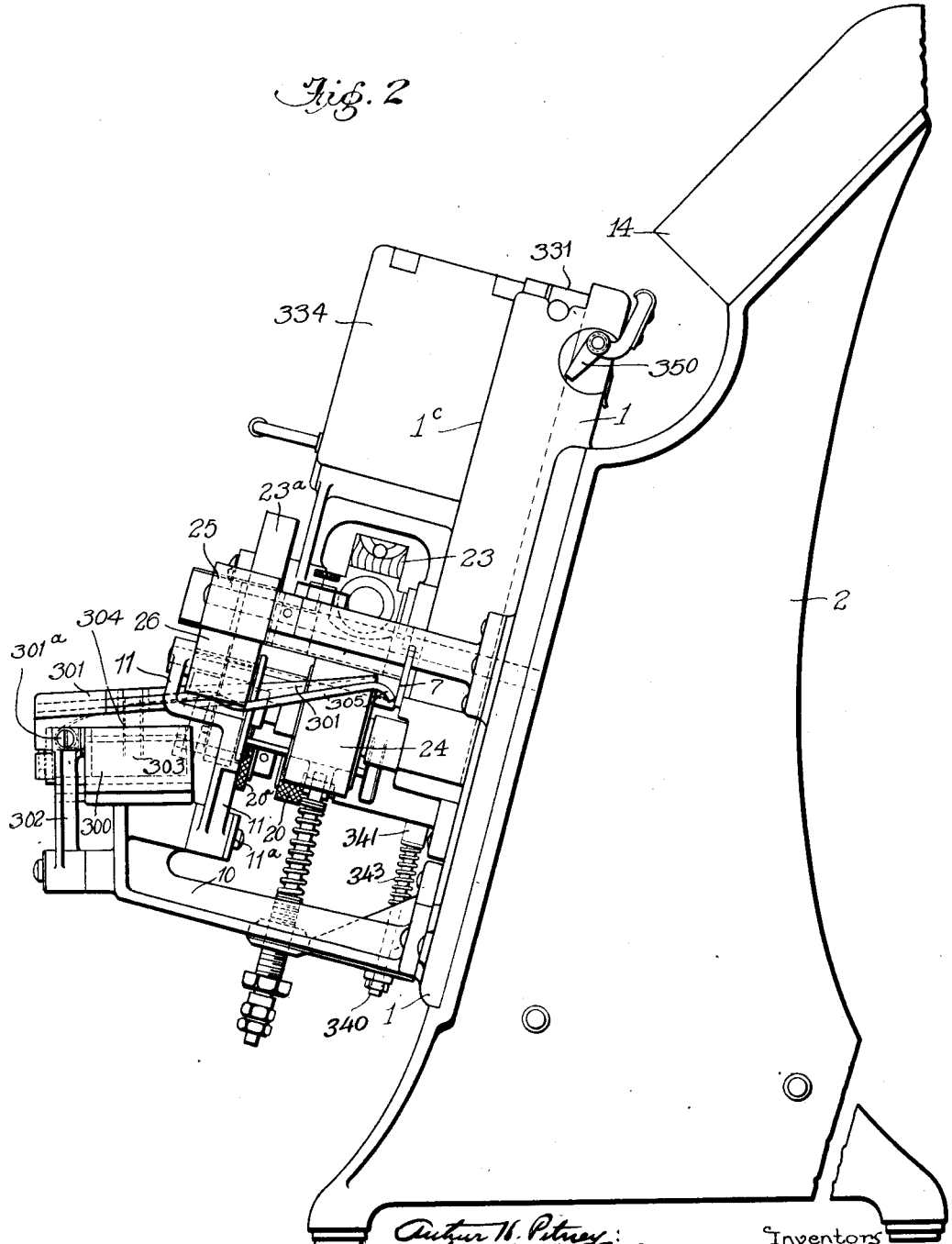

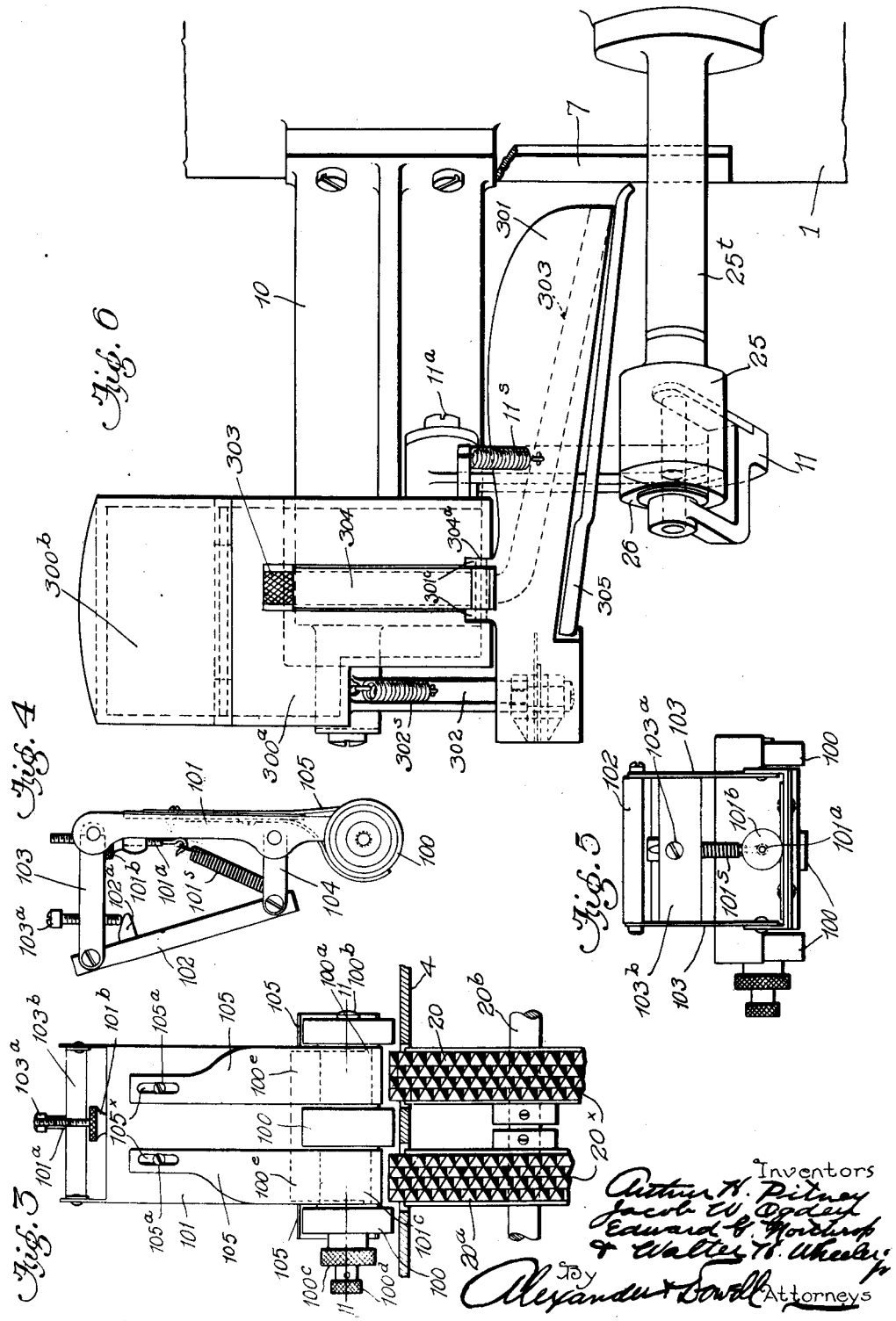

Oct. 18, 1927.  
A. H. PITNEY ET AL  
1,646,106  
MOISTENER AND SEALER FOR POSTAGE METER MACHINES  
Filed March 22, 1924  
5 Sheets-Sheet 4

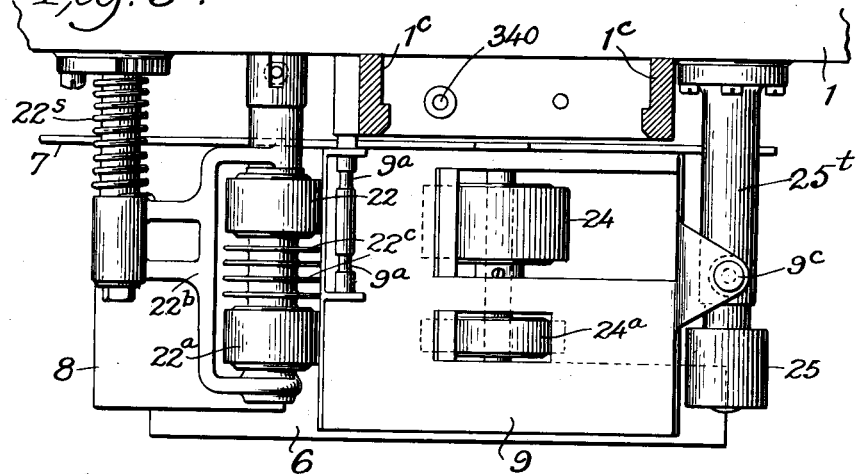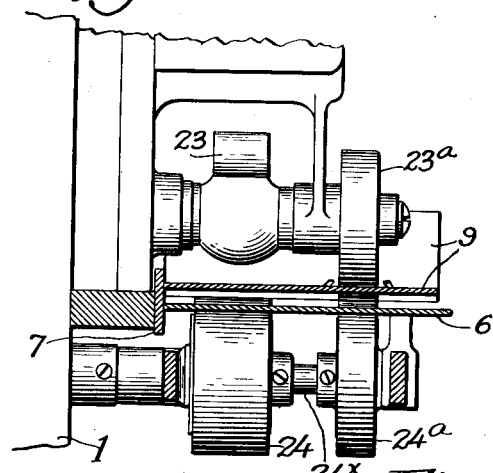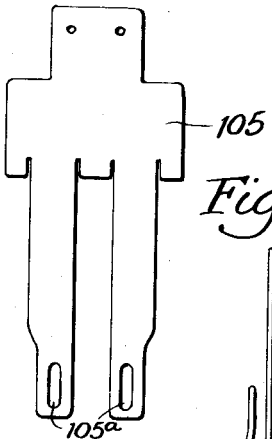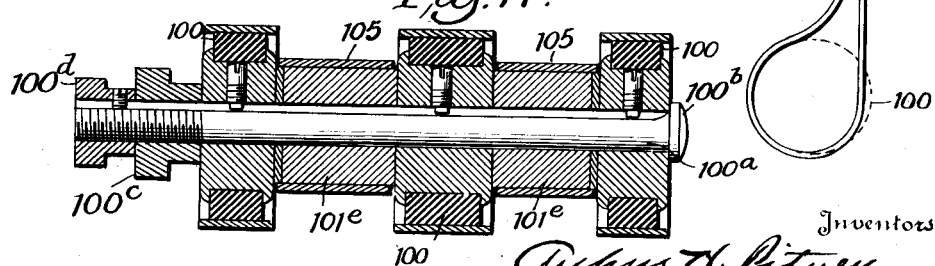

Patented Oct. 18, 1927.

1,646,106

UNITED STATES PATENT OFFICE.

ARTHUR H. PITNEY, JACOB W. OGDEN, EDWARD G. NORTHROP, AND WALTER H. WHEELER, JR., OF STAMFORD, CONNECTICUT. ASSIGNORS, BY MESNE ASSIGNMENTS, TO PITNEY-BOWES POSTAGE METER COMPANY, OF STAMFORD, CONNECTICUT, A CORPORATION OF DELAWARE.

MOISTENER AND SEALER FOR POSTAGE-METER MACHINES.

Application filed March 22, 1924. Serial No. 701,219.

Our invention is a novel improvement in postage meter machines, of the general character shown and described in Letters Patent to Arthur H. Pitney, No. 1,370,668, dated March 8, 1921, reissued December 18, 1923, No. 15,734.

The principal object of the invention is to provide a novel machine whereby pieces of mail can be taken successively, one at a time, from a feed hopper containing a quantity of pieces and fed past printing devices which imprint the "metered mail" indicia thereon; and then fed past sealing devices whereby the gummed portion of the flaps of the envelopes are moistened, and sealed. The printing is accomplished by means of a die controlled by a meter which regulates each imprint and automatically locks when a predetermined prepaid number of impressions have been made. The meter is preferably detachable from the machine, and constructed substantially as shown and described in the aforesaid patents.

Subsidiary objects of our invention are to provide (1) novel mail separating means; novel tripping means; novel sealing means; and a general novel organization of parts making up the complete machine. Other minor objects of the invention and novel features of construction and novel combinations of parts will be hereinafter described.

We will explain the invention with reference to the accompanying drawing, which illustrate one practical embodiment of the invention and the various novel details of construction and novel combinations of parts therein. An understanding of the machine illustrated will enable others familiar with the art to adopt and use the invention, perhaps embodying it in other external forms within the broader aspects of the invention; and we refer to the claims appended to the description of the aforesaid machine for summaries of the invention, and various novel features of construction and novel combinations of parts for which protection is desired.

Figure 8:
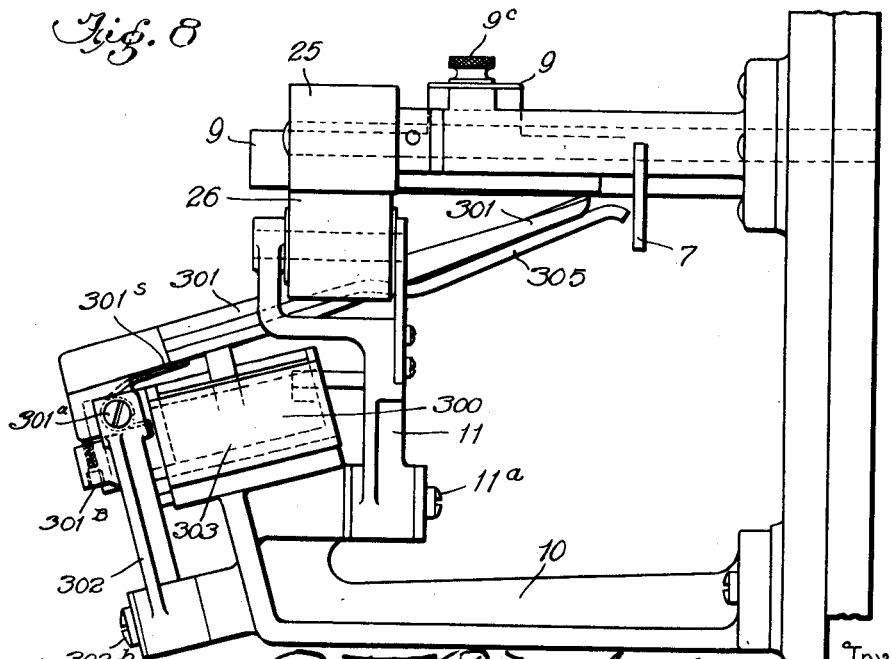

In the drawings:

Figure 1 is a front view of the complete machine embodying the invention; the operative parts of the machine being preferably set at a slight angle to the horizontal plane of the support on which the machine is mounted as indicated in Fig. 2. Fig. 2 is an end elevation of the machine shown in Fig. 1 with the envelope sealing hopper removed. Fig. 3 is an enlarged detail sectional view illustrating the devices for separating the letters from the feed hopper and forwarding them to the post-marking and sealing devices. Figs. 4 and 5 are enlarged detail views of such separating devices. Fig. 6 is an enlarged top plan view of the envelope sealing devices. Fig. 7 is a front elevation of the devices shown in Fig. 6. Fig. 8 is an end elevation of the devices shown in Fig. 6. Fig. 9 is a detail sectional view approximately in the plane of the guard plate 9, Fig. 1. Fig. 10 is a detail sectional view approximately on the line 10—10, Fig. 1. Fig. 11 is an enlarged sectional view on the line 11—11, Fig. 3. Fig. 12 is a detail view showing the blank for guard plate 105 before it is folded. Fig. 13 is a detail edge view of the blank, as folded.

*The envelope feeding devices.*

As shown in the drawings a base plate 1, Figs. 1 and 2, is supported by frames 2 at an angle of about fifteen degrees from the vertical and at the front of this bed plate are mounted the various feed rollers, guides, etc., and at its rear are mounted the driving gearing clutches and tripping devices.

Mounted on the base plate 1, at the left-hand side, Fig. 1, is a feed hopper preferably consisting of a back plate 3, bottom plate 4, and a tail piece $4^b$ and a side plate 5. The mail to be imprinted and sealed is placed in the hopper with the opening of the envelopes toward the back plate 3, and the flaps underneath.

The envelopes are necessarily fed from the hopper by two continuously revolving feed sectors, 20 and $20^a$, mounted on a shaft $20^b$. When the sectors are rotated the major peripheries of the sectors 20 and $20^a$ will project through openings in the bottom plate 4 of the hopper (see Figs. 1 and 3) and feed the bottom envelope in the hopper out of the hopper and to the right, beneath the lower end of plate 5, by reason of the friction of the faces of the segments against the lowermost letter. The faces of the segments are preferably covered with rubber, as indicated at 20ˣ Fig. 3, to increase the friction of the surface.

The feed sectors 20 and 20ᵃ are so timed with relation to the operation of the other devices of the machine as to advance the letters at such intervals as will ensure a proper space between the tail of any one letter and the leading end of the next following letter; such space being of sufficient length to allow the trip finger 200, hereinafter described, time to act freely.

By using feed sectors, the feed is rendered intermittent in its action although the sectors are rotated at uniform speed. After a letter is properly started on its way by the sectors the feeding action of the sectors cease and there is nothing tending to feed the next letter out of the hopper until, during the next revolution of the sectors their faces 20ˣ come into contact with it. The rubber faces 20ˣ of the sectors are preferably corrugated or serrated, in order to increase their friction on the letters to be fed.

To make sure that all the letters in the feed hopper have their forward ends close against the plate 5, so that they will be in position to be engaged by the feed sectors 20 and 20ᵃ when they reach the bottom, the piece 4ᵃ is adapted to tip up the rear end of the pile, so that the letter will gravitate toward the mouth of the hopper. This tail piece 4ᵃ (Fig. 1) has a hinged leaf 4ᵇ, which is held in an angular position by the spring 4ᶜ. The tail piece can be adjusted on the bottom plate 4 to accommodate long or short mail, and may be held in position on plate 4 by any suitable means. As shown a stud 4ᶜ is secured to the under side of plate 4ᵃ, and passes through an elongated slot in plate 4; and a flat spring loop 4ᵈ is secured to the end of stud 4ᶜ by a nut, and the free end of the loop is perforated to engage the stud 4ᶜ, Fig. 1. The friction between the end of spring 4ᵈ and the bottom of plate 4 is sufficient to hold plate 4ᵃ in any position in which it is adjusted by hand; and the loop spring 4ᵈ forms a convenient handle for adjusting plate 4ᵃ.

A sufficient space is left between the bottom plate 4 and the side plate 5 of the hopper to allow letters from the bottom of the pile in the hopper to be passed under plate 5. As the feed sectors 20 and 20ᵃ move the bottom letter from the hopper the frictional contact between such letter and the one next above it might cause the superposed letter to also pass through. To prevent this we provide a novel separator by which the superposed letter is held back.

*The separator.*

The separating member is of the type known as a "wiper separator", which "wipes" over the surface of the sectors in such a manner that if two envelopes are simultaneously fed forward the "wiper" will hold the upper one of them back, while the segments advance the other.

As shown, the separator is composed of three rubber faced rollers 100 (Figs. 3, 4 and 11) keyed on a pin 100ᵃ, which is in turn secured to the movable member 101 of a "pantograph" frame. The pin 100ᵃ passes through lugs 101ᶜ on the lower part of frame 101; and one of the rollers 100 is arranged between the lugs and one is arranged on each side of part 101, outside the lugs (see Figures 3 and 11). Spacing collars 100ᵉ are placed on pin 100ᵃ at each side of the middle roller 100. The separator is so positioned that the spaced feed sectors 20 and 20ᵃ operate in the spaces between the rollers 100; without contacting them. Pin 100ᵃ has a head 100ᵇ on one end, and its other end is threaded to receive a knurled nut 100ᶜ. When nut 100ᶜ is tightened, the rollers, spacing collars, and the two lugs 101ᶜ are clamped together sufficiently to prevent the rollers or pin being turned by the frictional contact of a passing letter. A knurled head 100ᵈ pinned on the threaded end of pin 100ᵃ provides a convenient means for turning the pin and rollers when it is desired to shift the rollers to bring new portions of their rubber faces into position to engage the letters.

The fixed member 102 of the pantograph frame is secured to the plate 5 of the feed hopper and is connected to the movable part 101 by pairs of links 103, and 104 (Figs. 1, 3, 4 and 5). The movable part 101 is urged downwardly by a spring 101ᵉ, but its movement is limited by a stop 102ᵃ, fixed to part 102; and an adjusting screw 103ᵃ, mounted in a cross bar 103ᵇ between the links 103. The tension of spring 101ᵉ is regulable by a threaded hook 101ᵃ, and knurled nut 101ᵇ.

The three rubber faced rollers 100 alternating with the segments 20 and 20ᵃ prevents any friction between the separator and feed when the machine is running idly.

A sheet metal guard loop 105 is fastened to the part 101 of the frame (Figures 3, 4, 12 and 13) and partly surrounds the rollers 100, leaving only a small portion of their rubber faces exposed on the side next the feed hopper. This guard 105 is capable of slight adjustment to compensate for the wear of the rubber faces of the rollers 100; its fastening screws 105ᵃ passing through elongated openings 105ˣ (see Fig. 3.)

The metal guard 105 shields a large part of the surface of the three rollers 100 and prevents excessive friction between the wiper rollers and a thick letter, as the latter can easily slip on the polished metal of the guard until it is checked by frictional contact with the rollers. The frame in which the wiper rollers are mounted permits them to move in a direction perpendicular to the direction of the feed; which movement is controlled by spring 101ª which urges the wiper rollers toward the feed sectors at all times, but will allow letters of varying thicknesses to pass.

The forwarding rollers.

After passing out of the feed hopper, the letter is passed between a pair of revolving feed rollers 21ª and 22ª; the axis of rotation of roller 21ª is fixed; but roller 22ª is mounted in a swingable support 22ᵇ so that it can yield laterally to accommodate varying thicknesses of letters (see Figs. 1 and 9).

In passing between the rollers 21ª and 22ª, each letter passing through the machine actuates the trip finger 200 controlling the printing die, by pushing the trip finger out of its path; as hereinafter explained.

The rollers 21ª and 22ª forward the letters to and between a printing couple consisting of an engraved die 23 (Figs. 1, 10, and 15), preferably mounted on the "meter", and an impression roller 24 mounted on a continuously revolving yieldable shaft 24ˣ mounted in a spring controlled rocking frame 24ᵇ (see Fig. 1), substantially as shown and described in the aforesaid patents. The parts are so constructed and operated that the die 23 makes one revolution for each letter passing between the trip rollers 21ª and 22ª; said die being controlled by the tripping mechanism hereinafter referred to.

The printing devices and meter.

In the machine shown, the printer 23 is shown as mounted on a spindle 337 in a removable "meter" (Figs. 14 and 15) which is operably constructed as shown and described in the aforesaid Reissue Patent #15,734. This meter has a base 331 in which is journaled the spindle 337, on which the printer 23 and roller 23ª are mounted. This roller also has a casing 334, in which are mounted ascending and descending registering mechanisms indicated at T and B and locking mechanisms such as described in said patent. Operating means are provided as described in said patent whereby the meter is positioned in the machine the printer carrying the spindle 337 will be actuated once for each piece of mail matter passing through the machine until the amount of prepaid postage for which the meter has been set is exhausted, and then the meter and the machine will be automatically locked.

An idler roller 23ª is loosely mounted on spindle 337 and is driven by frictional contact with the letters which are moved past the die by roller 24ª on the shaft 24ˣ of the impression roller 24; and roller 24ª being continuously driven will also assist in forwarding the letter after the die 23 has stopped.

The meter 331 has a base adapted to be entered between side flanges 1ᶜ on the base 1, which holds it securely in position.

Trip.

The means for releasing, driving and stopping the die by the combined trip and clutch action, and also the meter in which the die is mounted are constructed and operated substantially as described in the aforesaid patents, with the exception of the trip finger and coacting disks, and as shown and described in companion divisional application Serial No. 758,778, filed December 29, 1924.

The envelope guides.

A plate 6 (Figs. 1, 9 and 10) is secured to the rocking frame 24ᵇ, and pierced with openings through which rollers 21 and 21ª; and 24 and 24ª, and also the trip finger 200 protrude. This plate supports and guides the letter in its passage and prevents the letter being deflected. A guide plate 8 is secured to the rocking frame 22ᵇ above the plate 6 to assist in guiding the letters. A plate 7 arranged in a plane parallel with the plane of the bed plate 1, and in line with the back plate 3, of the feed hopper, is arranged to guide the rear edge of the moving letter. Another guide plate 9 is arranged above and parallel with guide 6, and is pivoted at one end on a stud 9ª, and at the other end is secured by a knurled head screw 9ᶜ to a bracket 25ᵗ.

When the meter is removed, the guide 9 can be swung up out of the way, when cleaning the machine. Openings are made in guide 9 for the die 23 and idler 23ª, and these openings are continued on past the sealer nose so that the fresh imprints will not drag on the guide and smear. The guide 9 is bent down at 9ᵇ to guide the envelope into contact with the sealer nose 301.

The sealer.

A water reservoir 300 (Figs. 6, 7 and 8) is secured to the end of a bracket 10 attached to base 1; and is provided with a cover having a fixed part 300ª, and a removable part 300ᵇ, (Fig. 6) to facilitate filling it with water to supply the moistening wick 303.

The sealer "nose" 301 is a wedge-shaped piece of metal, sharp on the edge first presented to the envelope and becoming thicker toward the opposite sides. This nose is attached to the free end of an arm 302, pivoted at 302ᵇ to the bracket 10 below the reservoir 300. A spring 302ª holds arm 302 and the sealer nose 301 in their normal position (Fig. 7). A stop 302ª secured to bracket 10 arrests arm 302 when in normal position.

The nose 301 is pivoted at 301ª to the arm 302, the axis of said pivot being parallel to the line of travel of the mail; and the nose is normally pressed upward to engage a passing letter by a spring 301ˢ. The upward movement of the nose is limited by an adjustable stop screw 301ᵇ.

Suitably secured in a slot in the under side of the nose 301 is a felt wick 303, which projects but slightly below the face of nose 301. This wick extends from near the top of the nose backward to a point opposite the water tank 300, where it enters the water.

A swingable guard 304 (Figs. 6 and 7) is pivoted at 304ª between lugs 301ᶜ on the nose 301, and covers the wick 303 at the place where it enters the reservoir and insures its reentering the reservoir in case the nose 301 should be depressed a considerable distance by an abnormal piece of mail.

A guide 305 attached to the side of nose 301 holds the flap in close contact with the wick while the flap is passing the nose; and returns the moistened flap to the body of the envelope after passing the nose.

In our machine the envelopes are placed in the feed hopper in an approximately horizontal position with their flaps on the under sides and, after being fed and imprinted as described, are passed over the nose 301 of the sealer. That part of the felt wick which is in the nose lies on a plane but slightly raised above the water level of the reservoir, so that the wick is constantly saturated with water, drawn by capillary attraction from the reservoir.

In passing the nose of the sealer, the envelope flap is slightly opened by reason of the sharp edge of the nose 301 insinuating itself between the body and flap. The body of the envelope passes over the nose while the partly opened flap is forced to pass under the nose, and in so doing its gummed side is dragged across the felt wick 303, which applies moisture to the gum on the flap. After passing the nose the under side flap comes in contact with a guide 305, which presses the flap against the body of the envelope and the moistened gum on the flap adheres to the body, thus sealing the envelope. The envelope is then dropped into a suitable receptacle.

As the time necessary for the moisture on the flap to percolate through the gum is a factor to be considered in the sealing process: the sealing is completed after the envelope has lain for a time in the receptacle, the flap being on the under side the weight of the body and contents of the envelope are sufficient to hold the flap against the body until it adheres to it.

The novel characteristics of the sealer are applying moisture to the flap while positioned on the under side of the envelope; pressing the flap upward against the envelope to start the sealing; and completing the sealing by the weight of the envelope itself, assisted by the weight of others in the stack.

Another novel characteristic of the sealer is that the nose 301 can rock away from the path of the envelope under certain abnormal conditions; for instance, it sometimes happens that a letter already sealed is placed in the feed hopper of the machine; and in such a case when the end of the nose 301 of the sealer attempts to enter between the flap and body it is prevented from doing so on account of the flap being sealed; in such case if the nose were rigid, such letter would catch on the nose and be stopped; and the following letters would be obstructed and clog up the machine and probably be mutilated. To prevent such undesirable clogging the nose is retained in its normal position by spring pressure, strong enough to meet the ordinary resistance of the passing envelopes, but light enough to yield under such abnormal conditions; and therefore in the event of a sealed letter coming in contact with the nose as stated, the nose will rock downward and such sealed letter will be deflected from the regular letter path and fall under the machine instead of into the stackers. The nose will free itself from the envelope as the nose swings down; and the nose will return to its normal position as soon as the sealed letter is shunted out of the way, and in time to properly seal the following letters passing through the machine.

After passing the sealer, the letters pass between a pair of delivering rollers 25 and 26, the former revolving on a constantly driven spindle mounted in a fixed bracket 25ᵗ. Roller 26 is driven by friction, and is mounted on the free end of a spring controlled swinging arm 11 (Figs. 6 and 8) pivoted at 11ª on the bracket 10. Rollers 25 and 26 are placed far enough away from the bed 1 to clear the wet imprints on the letters. The rollers 25 and 26 feed the letters into a stacker 12, as shown in Fig. 1, or other suitable receptacle.

The stacker 12 may be a box or hod with three sides, and is preferably slidably mounted on a bar 13 attached to the base 1 of the machine. The stacker is preferably inclined to better retain and align the letters dropped into it.

A tray 14 may be mounted on the upright frame 2, to conveniently hold mail matter preparatory to printing and sealing same.

The shafts of the feed sectors 20ª, the feed roll 21ª, impression roller 24, the delivery roller 25, and the clutch by which the spindle of the printing die 337 is driven when the meter is positioned in the machine, are all driven in proper time and manner by gearing and mechanism at the back of the base 1, which gearing and mechanism may be substantially as shown and described in the aforesaid patent, or of any suitable kind and as this gearing and mechanism is not a feature of the present invention, and will be readily understood by those familiar with the art, and readily supplied by a mechanic without invention we have deemed it unnecessary to illustrate or describe the same in detail.

We do not herein claim the particular separating device herein described and illustrated in Figures 4, 5 and 11 to 13 of the drawings, as these form the subject matter of companion divisional application Serial No. 758,777 filed December 29, 1924.

Neither do we claim herein the particular trip devices described herein and more particularly illustrated in Figures 14, 15 and 16 as this forms the subject matter of divisional companion application Serial No. 758,778 filed December 29, 1924.

Neither do we claim herein the particular meter mounting as this is subject matter for a divisional application.

We claim:

1. In a machine of the character specified having means for feeding letters; a flap moistener having a yieldably mounted nose adapted to open the flap and enter between the flap and the envelope when the flap is lowermost; means on the nose for moistening the flap as the envelope is moved thereapast; and means for yieldingly supporting the nose to permit it to yield to shunt a sealed piece of mail out of the letter path.

2. In a machine of the character specified having means for feeding letters; a sealer having a nose adapted to enter between the flap and the envelope when the flap is lowermost; means on the nose for moistening the flap; and a means for pressing the moistened flap against the envelope, with means for yieldingly supporting the nose to permit it to yield to shunt a sealed piece of mail out of the letter path.

3. In a machine of the character specified, having envelope feeding and delivering means; a sealer intermediate the feeding and delivery means, said sealer having a yieldably mounted nose adapted to open the flap and enter between the flap on the under side of the envelope and moisten the gummed side of the flap, and means for yieldingly supporting the nose to permit it to yield to shunt a sealed piece of mail out of the letter path.

4. In mechanism of the character specified having means for feeding printing and delivering letters; a sealer having a yieldably mounted nose adapted to open the flap and enter between the flap and the envelope when the flap is lowermost; a wick on the under side of the nose for moistening the flap; and means for yieldingly supporting the nose to permit it to yield to shunt a sealed piece of mail out of the letter path.

5. In mechanism of the character specified having means for feeding printing and delivering letters; a sealer having a nose adapted to enter between the flap and the envelope when the flap is lowermost; a wick on the under side of the nose for moistening the flap; and a finger for pressing the moistened flap against the envelope, with means for yieldingly supporting the nose to permit it to yield and shunt a sealed piece of mail out of the letter path.

6. In a machine of the character specified having envelope feeding devices, printing means and delivery means; a sealer having a nose adapted to enter between the flap on the under side of the envelope and moisten the gummed side of the flap, and a finger for pressing the moistened side of the flap against the body of the envelope; with means for yieldingly supporting the nose to permit it to yield and shunt a sealed piece of mail out of the letter path.

7. A sealer for the purpose specified comprising a reservoir; a yieldable nose carrying a wick; a swingable arm carrying said nose; and a member attached to the nose for directing the wick into the reservoir.

8. In a sealer for the purpose specified; a reservoir; a swingable arm, a nose pivoted on said arm; a wick on the under side of said nose; and a pivoted member attached to the nose for directing the wick into the reservoir.

9. In a sealing mechanism of the character specified, a reservoir; means for forwarding a letter envelope past the sealer flap downward, a reservoir, a nose adapted to engage the flap; a moistener on the nose adapted to apply moisture to the flap; a pivoted support on which the nose is mounted; a spring for yieldingly holding the nose in operative position; said spring permitting movement of the nose by a sealed letter to deflect such letter out of the machine.

10. In a sealing machanism of the character specified, means for forwarding letters flap downward; a reservoir; a nose adapted to engage the flap; a pivoted support on which the nose is mounted; a moistening wick on the under side of the nose adapted to apply moisture to the flap; a pivoted member connected with the nose for directing the wick into the reservoir; a spring normally holding the nose support in elevated position; said spring permitting the movement of the nose by a sealed letter to deflect such letter out of the machine.

11. In mechanism of the character specified having means for feeding and delivering letters; a sealer having a yieldable nose adapted to open the flap as the envelope is advanced past the nose, and enter between the flap and the envelope; a wick on the nose for moistening the flap; and means for yieldingly supporting the nose to permit it to yield to shunt a sealed piece of mail out of the letter path.

In testimony that we claim the foregoing as our own, we affix our signatures.

ARTHUR H. PITNEY.
JACOB W. OGDEN.
EDWARD G. NORTHROP.
WALTER H. WHEELER, Jr.